March 22, 1927.
C. L. CHARLES
1,621,493
RAILWAY CAR TRUCK
Filed Aug. 27, 1925
2 Sheets-Sheet 1
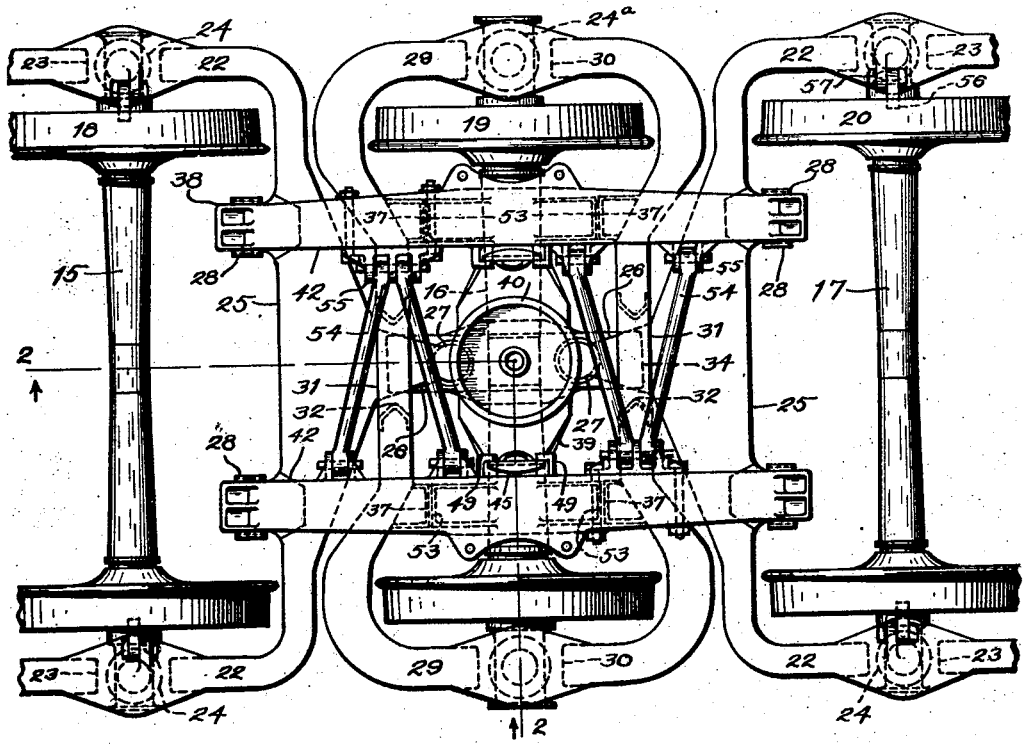
Fig. 1
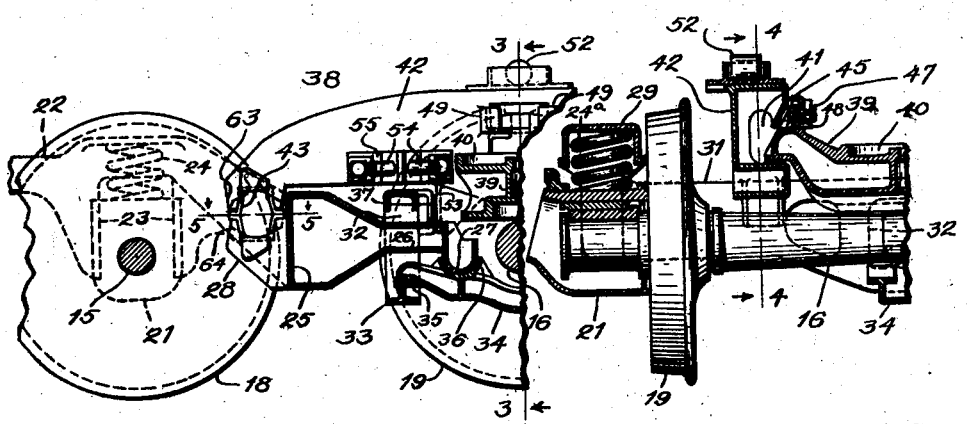
Fig. 2
Fig. 3
Inventor
Carl L. Charles
By John W Darley
Attorney

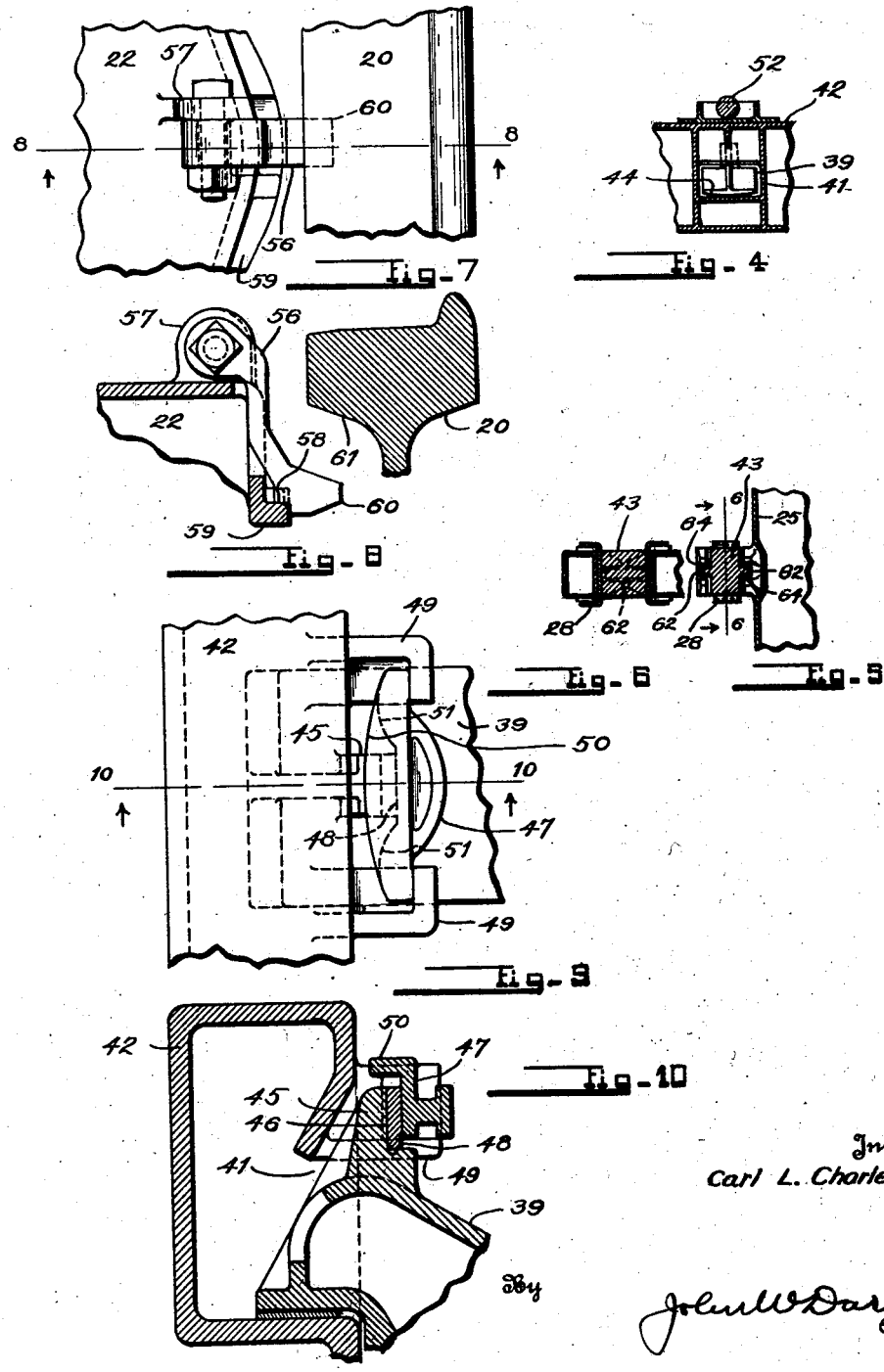

Patented Mar. 22, 1927.

1,621,493

UNITED STATES PATENT OFFICE.

CARL L. CHARLES, OF BALTIMORE, MARYLAND, ASSIGNOR TO BOYDEN STEEL CORPORATION, OF BALTIMORE, MARYLAND, A CORPORATION OF MARYLAND.

RAILWAY-CAR TRUCK.

Application filed August 27, 1925. Serial No. 52,817.

My invention relates to railway car trucks.

One object of my invention is to devise a truck so constructed and arranged that the carrying capacity per unit weight of said truck is the maximum obtainable, thereby securing a truck which is free from excess weight and correspondingly more economical.

A further object is to devise a six wheel coordinating truck of the character illustrated and described in U. S. Letters Patent No. 1,568,058, issued January 5, 1926, in which the pivotal connections of the end bolsters with the central bolster are brought closer to each other, thereby reducing the turning effort on said last named bolster and steadying the same, and also shortening the wheel base of said truck.

A further object is to devise a truck of the character last described in which a more effective control of the positioning of the central bolster by the coordinating bolster is obtained through a novel arrangement of the engaging surfaces of said bolsters.

A further object is to devise a six wheel truck so constructed and arranged that the same may be bodily raised from the truck by means of slings or similar devices, secured to the journal bolsters.

In railway car trucks as now constructed, the carrying capacity per unit weight of the truck ratio varies widely, but in all instances so far as I am aware, trucks have not been designed with a view of obtaining the maximum value of said ratio. It is obvious, therefore, that such trucks are relatively heavy and correspondingly more costly when considered from the standpoint of the loads which they are designed to carry. Moreover, the excess dead weight which present day trucks carry not only increases the draw bar pull on the locomotive and therefore the cost of transportation, but is also more destructive of the roadbed.

With these disadvantages in mind, it has been my object to devise a truck that will adequately meet all rail requirements and that will be free from excess weight. This object has been attained by distributing the load on the truck in such a manner that the end axles and wheels are lighter than the central axle. The proportion of the load sustained by each of the former is therefore less than that borne by the latter, but it is contemplated that the end axles and wheels will carry their rated capacity.

Further, an improved truck over that illustrated and described in the patent hereinbefore referred to, has been achieved by decreasing the distance between the pivotal connections of the end bolster with the central bolster. This arrangement lessens the tendency of the end bolsters to cant the central bolster from a horizontal position during the operation of the truck and also shortens the wheel base. Likewise, a more positive and stabilized control of the central bolster by the coordinating bolster is obtained by a disposition of the engaging surfaces of each, in which the distance between the two sets of surfaces on one side of the longitudinal axis of the truck is increased, as is also the transverse distance between sets on opposite sides of said axis. Both of the foregoing changes result in a generally improved operation of the truck.

In order to facilitate repairs and other handling of the truck which require bodily removal of the same, I have devised means whereby the entire truck may be lifted from the rails merely by applying slings to the three bolsters. The particular manner of obtaining this result will be described more fully hereinafter.

My improved truck comprises six wheels mounted upon three axles and each axle is revolubly mounted in a member. The pilot and trailer members are connected to the central member by what is substantially a ball and socket joint so that each member may move vertically and transversely horizontally without producing a corresponding movement of either or both of the other members.

Means are also provided for producing a horizontal coordinating action of the wheels and journals so that the wheels will conform to the contour of the rails whatever it may be, and so that the angular position of the central axle will be coordinated to the position of either or both the pilot and trailer axles. The horizontal coordinating action involved in my improved truck is clearly illustrated and explained and the method and means by which said action is effectuated is set forth in U. S. Letters Patent No. 1,341,776, issued June 1st, 1920.

In combination with the horizontal co-ordinating action just referred to, my improved truck involves equalized vertical actions of the several members of the truck and the method of accomplishing the horizontal coordinating action of truck members in combination with an equalized vertical action thereof is set forth in U. S. Letters Patent No. 1,341,777, issued June 1st, 1920. In the last named Letters Patent there is also set forth one means for effecting the horizontal coordinating action of the several members in combination with an equalized vertical action thereof. A further means of effecting the horizontal coordinating action of the several members in combination with an equalized vertical action thereof is illustrated and described in U. S. Letters Patent No. 1,568,058 above noted.

In the drawings:—

Fig. 1 is a plan view of a six wheel truck constructed according to my invention, the brake shoes and allied parts being omitted for the sake of clearness, together with the side bearings.

Fig. 2 is a sectional side elevation of a portion of the truck taken along the line 2—2 in Fig. 1 and looking in the direction of the arrows.

Fig. 3 is a sectional end elevation of a portion of the truck taken along the line 3—3 in Fig. 2 and looking in the direction of the arrows.

Fig. 4 is a partial section along the line 4—4 in Fig. 3 looking in the direction of the arrows.

Fig. 5 is a section along the line 5—5 in Fig. 2 looking in the direction of the arrows.

Fig. 6 is a section along the line 6—6 in Fig. 5 looking in the direction of the arrows.

Fig. 7 is an enlarged plan view of the means utilized for raising the wheels when the end journal members are lifted.

Fig. 8 is a sectional elevation along the line 8—8 in Fig. 7 looking in the direction of the arrows.

Fig. 9 is an enlarged plan view of the means for locking together the elements of the coordinating bolster.

Fig. 10 is a section along the line 10—10 in Fig. 9 looking in the direction of the arrows.

In the drawings:—

The numerals 15, 16 and 17 represent, respectively, the pilot, central and trailer axles. Said pilot and trailer axles are lighter in weight than said central axle and have secured on their ends correspondingly lighter wheels 18 and 20 than the wheels 19 which are secured to said central axle. These differences in weight of the various axles and wheels are provided for a purpose hereinafter explained. The journals of all of said axles are mounted in any approved form of axle box such as 21 and the wheels and axles are of American Railway Association standards.

Each pilot and trailer bolster consists of a pair of pedestals such as 22, each pedestal being provided with a recess having jaws 23 for the reception of the axle box 21 which slides freely therein and springs 24 are placed between each axle box and the top of the corresponding recess. The pedestals 22—22 of each end bolster are joined together by a frame 25 and said frame is provided with an extension 26 terminating in the boss 27 having a hemispherical lower surface. The frame 25 is further provided with two bases 28—28 for a purpose hereinafter explained and with suitable ears, not shown, for the support of brake parts. The brake parts forming no part of my present invention are not illustrated or described.

The central bolster consists of a pair of pedestals such as 29—29, each pedestal being provided with a recess having jaws 30 for the reception of the axle box 21 which has free vertical movement therein, and springs 24ª are placed between each axle box and the top of the corresponding recess. The pedestals 29—29 of the central bolster are joined together by the frames 31—31 and said frames may be provided with suitable ears for the support of brake parts.

In each of said frames is formed a passage 32, disposed on the longitudinal axis of the truck, and the lower side of said passage is defined by the I section 33. A truss frame 34 is positioned beneath the axle 16 and the ends of said frame rests on the section 33, endwise movement of said frame being prevented by shoulders 35 which contact with said section. A pair of sockets 36—36 are provided on the frame 34, each of said sockets being positioned between the axle 16 and the frame 31. One of the bosses 27 is introduced through the passage 32 and placed in each of the sockets 36 and thus serves to connect the corresponding pilot and trailer bolsters with the central bolster. The frame 31 is further provided with four true surfaces 37 for a purpose hereinafter explained.

In order to transmit the weight of the car body and its attendant loading to the three bolsters hereinbefore mentioned and to correlate their movements, I employ a coordinating bolster 38. Said bolster is composed of elements so arranged that the latter can have no relative horizontal movement, but are capable of relative vertical movement. The bolster 38 will therefore be characterized by flexibility in vertical planes and hence will be adaptable to variations in the track contour, thereby assuring that each wheel will receive its proper proportion of the total load.

To the foregoing end, the bolster 38 comprises a central member 39 having the truck center plate 40 which contacts with the car body in any approved manner. The ends of said member are inserted in openings 41 formed in a pair of longitudinal beams 42—42 which are disposed on opposite sides of the longitudinal axis of the truck and substantially parallel thereto, and the ends of said beams rest upon friction reducing elements 43, one of said elements being mounted between each end of the beams 42 and the corresponding base 28.

In order to permit a vertical rocking action of the beams 42 with respect to the member 39, the bearing surfaces on the ends of said member are curved as shown at 44 in Fig. 4. The openings 41 have sufficient length that the member 39 may be easily placed in position, and so as to allow of the rocking engagement above referred to, but not sufficient to permit undue horizontal displacement of said member with respect to said beam. Transverse movement of the member 39 relative to the beams 42 and also any rolling movement of the latter are prevented through the following instrumentalities. A nose 45 having a vertical surface 46 is provided on the member 39 adjacent each end thereof and said nose is adapted to coact with a locking element 47 through a wear plate 48 of suitable thickness which rests on said member. Said element is carried in stirrups 49—49 formed on the beam 42 and is flanged on its upper side, as at 50, to prevent upward movement of the plate 48 and is further thickened on each side of said plate as at 51—51, to prevent horizontal movement thereof. In assembling, the end of the member 39 is rested in the opening 41, a wear plate 48 of proper thickness selected and placed against the surface 46, after which the locking element 47 may be dropped into position and the member 39 and beam 42 will then be effectively secured together.

As already stated the center plate 40 supports the car body in any approved manner and the coordinating bolster 38, with reference to said body, may swing angularly about said plate. Any approved form of side bearings such as 52, adapted to coact with suitable wear plates secured to the under side of the car body, may be interposed between said body and the coordinating bolster. Further, the beams 42 are provided with four gibs 53, true on the outer surfaces thereof, two of said gibs being formed on each of said beams. The gibs 53 project downwardly and each has a sliding bearing upon one of the true surfaces 37 of the frame 31, thus connecting the coordinating bolster and the central bolster together in such manner that while the former can have angularly movement in a vertical plane and vertical and transverse movements with reference to the latter, yet the latter is forced to partake of the angular movement in a horizontal plane of the former.

In order to maintain the horizontal rigidity of the coordinating bolster and to secure its flexibility in vertical planes, I preferably employ the triangulated trusses 54, as shown in Fig. 1. Said trusses are secured to the beams 42 in such a manner that the latter can have no relative horizontal, but are capable of relative vertical movement. One method of securing the trusses 54 is shown in Fig. 1, in which the ends of said trusses are pivotally mounted between ears 55 formed on the beams 42. Said trusses are arranged on either side of the member 39 so that the coordinating bolster 38 may be reversed in direction without affecting its mode of operation. Moreover, it will be noted that the trusses 54, in addition to serving as a means of articulating the longitudinal beams together, resist transverse forces operating upon said beams. Under certain conditions, it is contemplated that the trusses 54 may be replaced by a simpler form of tying structure, such as straight bars and the like.

It is frequently desirable to raise the truck bodily from the rails for a variety of purposes and to accomplish this result, hooks 56 are secured at one end to lugs 57 provided on the pedestals 22, said hooks being substantially vertically aligned with the pilot and trailer axles. The opposite end of each of said hooks comprises a shoulder 58 which rests on a flange 59 formed on the pedestal 22 and also an enlarged nose 60 which is adapted to contact with the surface 61 on the inner side of the wheel 18 or 20, when the end bolsters are raised. It is therefore obvious that, when appropriate slings are placed under the three bolsters, the pilot and trailer axles and wheels will be raised as indicated above and the central axle and wheels will also be raised when the central bolster has been lifted sufficiently to secure contact of the truss frame 34 with said axle, said frame also serving to raise the pivoted ends of the pilot and trailer bolsters.

The operation of my improved truck is as follows:—

The pilot, central and trailer bolsters act coordinately horizontally according to the method set forth in U. S. Letters Patent No. 1,341,776, referred to above, with the exception that each pilot and trailer bolster is joined by a ball and socket joint to the central bolster adjacent the near side thereof. Movements of the pilot, trailer and central bolsters with reference to the coordinating bolster which are permitted by the ball and socket joints connecting the pilot and trailer bolsters to the central bolster insure the utmost freedom of the wheels in following the vertical contour of the track. As set forth in said patent, the coordinating movements of the members provide for the utmost freedom of the wheels in following the horizontal contour of the track.

Under working conditions, the vertical load from the car body is applied to the coordinating bolster 38 upon the center plate 40 and this load is then distributed to the beams 42—42, thence through the friction reducing elements 43 to the bases 28; from said bases, portions of the load are delivered to the pilot and trailer wheels and the remainder is delivered to the central wheels through the ball and socket joints connecting the pilot and trailer bolsters to the central bolster, the various parts being so proportioned and located that the load upon each of the center wheels is greater than that upon any of the end wheels. By this arrangement, the excess weight heretofore present in the end axles and wheels is eliminated without in any way affecting the efficient operation of the truck, but with a marked decrease in the total draw bar pull on the locomotive. The latter factor is of particular importance in trains of great length.

The flexible bolster 38 functions to transmit the load to the truck under changing conditions of the road bed, or of the loading, in the manner fully described in U. S. Letters Patent No. 1,568,058, above referred to, and will not be further adverted to, except to point out that said bolster adjusts itself to vertical movements of the central and end bolsters. The latter are therefore always receiving their proper share of the total load.

As either the pilot or trailer bolster moves angularly with respect to the central bolster, it turns about its ball and socket joint and by means of the tongues 62 on the friction reducing elements 43 which engage with suitable flanges 63 and 64 formed on the beams 42 and bases 28, respectively, moves the corresponding end of the coordinating bolster 38 about an axis substantially midway between the elements 43 at the other end of said coordinating bolster. It is the function of said elements during this action to permit of the free movement of the coordinating bolster relative to either the pilot or trailer bolster in addition to providing a means whereby the pilot or trailer bolsters control the movement of the coordinating bolster.

In the trucks illustrated and described in the patents hereinbefore referred to, considerable difficulty has been experienced in maintaining the central bolster in its correct horizontal position. In operation, this bolster exhibited a tendency to cant in either direction from the vertical and to cause excessive wear on certain of the parts. This problem has been solved by providing a "closer-coupled" truck, through placing the pivotal connections of the end bolsters with the central bolster nearer to the central axle. It is obvious that this construction lessens the turning effort of either end bolster on the central bolster and thus greatly increases the steadiness of the whole combination.

Moreover, it has heretofore been the practice to obtain engagement of the coordinating bolster and the central bolster through suitable wearing surfaces on the member 39 of the former and similar surfaces on the latter. In the truck of the instant application, however, it will be noted that the wearing surfaces on the coordinating bolster have been placed on the beams 42 which provides a more positive and stabilized control of the central bolster, as will be apparent from the positions of said surfaces with respect to the longitudinal and transverse axis of the truck.

Thus the truck illustrated and described herein not only provides an economical form of rolling stock in respect of the ratio of the carrying capacity per pound of the truck, but exhibits a greatly improved mode of operation without detriment to the coordinating principle inherent in the design.

While I have shown one preferred form of my improved truck for illustrating my invention, it is to be understood that the same is not to be considered as limited to the particular structure or combinations shown, for many changes may be made therein without departing from the spirit of my invention.

I claim:

1. In six wheel trucks, the combination of three journal members and axles for said members, each end member being mounted on a pivot positioned between the central member axle and the side of the central member adjacent thereto, whereby each end member moves only angularly about said pivot.

2. In six wheel trucks, the combination of three journal members and axles for said members, each end member being secured to the central member by a universal joint positioned between the central axle and the side of said central member adjacent thereto, whereby each end member moves only angularly about said joint.

3. In six wheel trucks, the combination of three journal members and axles for said members, each end member being secured to the central member by a ball and socket joint positioned between the central axle and the side of said central member adjacent thereto, whereby each end member moves only angularly about said joint.

4. In a six wheel truck, the combination of three journal members, each end member being mounted in telescopic relation through the adjacent side of the central member, whereby the rocking tendency of said last named member is diminished.

5. In a six wheel truck, the combination with a bolster for each pair of journals, a coordinating bolster engaging with the central bolster, and with each of the pilot and trailer bolsters to control the mutual angularity of said journals, friction reducing elements between said coordinating bolster and said pilot and trailer bolsters and a ball and socket joint disposed on each side of the central axle within the sides of said central bolster for connecting each of said pilot and trailer bolsters and said central bolster.

6. In a six wheel truck, the combination with a bolster for each pair of journals, a coordinating bolster comprising longitudinal beams for engaging with the central bolster and with each of the pilot and trailer bolsters to control the mutual angularity of said journals, friction reducing elements between said coordinating bolster and said pilot and trailer bolsters and a ball and socket joint between each of said pilot and trailer bolsters and said central bolster.

7. In a six wheel truck, the combination with a bolster for each pair of journals, a coordinating bolster comprising longitudinal beams for engaging with the central bolster and with each of the pilot and trailer bolsters to control the mutual angularity of said journals, friction reducing elements between said coordinating bolster and said pilot and trailer bolsters, and a ball and socket joint disposed on each side of the central axle within the sides of said central bolster for connecting each of said pilot and trailer bolsters and said central bolster.

8. In a six wheel truck, the combination with a bolster for each pair of journals, a coordinating bolster engaging with the central bolster and with each of the pilot and trailer bolsters to control the mutual angularity of said journals, said pilot and trailer bolsters comprising bases, friction reducing elements mounted on said bases, said coordinating bolster comprising longitudinal beams supported by said elements and adapted to engage with said central bolster, and a ball and socket joint between each of said pilot and trailer bolster and said central bolster.

9. In a six wheel truck, the combination with a bolster for each pair of journals, a coordinating bolster engaging with the central bolster and with each of the pilot and trailer bolsters to control the mutual angularity of said journals, said pilot and trailer bolsters each comprising bases provided with spaced flanges, said coordinating bolster comprising longitudinal beams adapted to engage with said central bolster and having ends provided with spaced flanges extending over said bases, a friction reducing element mounted between the flanges of each of said bases, and of the corresponding end of each of said beams, said element comprising tongues extending between the flanges of said base and beam, thereby providing engaging means between said pilot and trailer bolsters and the coordinating bolster, and a ball and socket joint between each of said pilot and trailer bolsters and said central bolster.

10. In a six wheel truck, the combination with a bolster for each pair of journals, a coordinating bolster engaging with a central bolster and with each of the pilot and trailer bolsters to control the mutual angularity of said journals, said pilot and trailer bolsters comprising bases located between the flanges on the wheels, friction reducing elements mounted on said bases, said coordinating bolster comprising longitudinal beams supported by said elements and adapted to engage with said central bolster, and a ball and socket joint between each of said pilot and trailer bolsters and said central bolster.

11. In a six wheel truck, the combination with a bolster for each pair of journals, a coordinating bolster engaging with the central bolster, and with each of the pilot and trailer bolsters to control the mutual angularity of said journals, said coordinating bolster comprising a central member and longitudinal beams adapted to have vertical rocking engagement with the ends of said central member and engagement with said central bolster, means to prevent the relative horizontal movement of said central member and beams, but permitting their relative vertical action, friction reducing elements between said coordinating bolster and said pilot and trailer bolsters and a ball and socket joint between each of said pilot and trailer bolsters and said central bolster.

12. In a six wheel truck, the combination with a bolster for each pair of journals, a coordinating bolster engaging with the central bolster and with each of the pilot and trailer bolsters to control the mutual angularity of said journals, said pilot and trailer bolsters comprising bases, friction reducing elements mounted on said bases, said coordinating bolster comprising longitudinal beams supported by said elements and adapted to engage with said central bolster, and a ball and socket joint disposed on each side of the central axle within the sides of said central bolster for connecting each of said pilot and trailer bolsters, with said central bolster.

13. In a six wheel truck, the combination with a bolster for each pair of journals, a coordinating bolster engaging with the central bolster and with each of the pilot and trailer bolsters to control the mutual angularity of said journals, said pilot and trailer bolsters each comprising bases provided with spaced flanges, said coordinating bolster comprising longitudinal beams adapted to engage with said central bolster and having ends provided with spaced flanges extending over said bases, a friction reducing element mounted between the flanges of each of said bases and of the corresponding end of each of said beams, said element comprising flanges extending over the flanges of said base and beam, thereby providing engaging means between said pilot and trailer bolsters and the coordinating bolster, and a ball and socket joint disposed on each side of the central axle within the sides of said central bolster for connecting each of said pilot and trailer bolsters with said central bolster.

14. In a six wheel truck, the combination with a bolster for each pair of journals, a coordinating bolster engaging with the central bolster and with each of the pilot and trailer bolsters to control the mutual angularity of said journals, said pilot and trailer bolsters comprising bases located between the wheel flanges, friction reducing elements mounted on said bases, said coordinating bolster comprising longitudinal beams supported by said elements and adapted to engage with said central bolster, and a ball and socket joint disposed on each side of the central axle within the sides of said central bolster for connecting each of said pilot and trailer bolsters with said central bolsters.

15. In a six wheel truck, the combination with a bolster for each pair of journals, a coordinating bolster engaging with the central bolster and with each of the pilot and trailer bolsters to control a mutual angularity of said journals, said coordinating bolster comprising a central member and longitudinal beams adapted to have vertical rocking engagement with the ends of said central member and engagement with said central bolster, means to prevent the relative horizontal movement of said central member and beams, but permitting their relative vertical action, friction reducing elements between said coordinating bolster and said pilot and trailer bolsters, and a ball and socket joint disposed on each side of the central axle within the side of said central bolster for connecting each of said pilot and trailer bolsters with said central bolster.

16. In a six wheel truck, the combination of three journal members, wheels and axles for said members, means on the end members adapted to engage with the corresponding wheels and means on the central member adapted to engage with the central axle when the journal members are raised vertically, whereby said truck may be lifted bodily from the rails.

17. In a six wheel truck, the combination of three journal members, the central member having passages disposed on the longitudinal axis of said truck on each side of the central axle and the end members being connected to said central member through said passages.

18. In a six wheel truck, the combination of three journal members, the central member having passages disposed on the longitudinal axis of said truck on each side of the central axle and the end members being pivotally connected to said central member through said passages.

19. In a six wheel truck, the combination of three journal members, the central member having passages disposed on the longitudinal axis of said truck on each side of the central axle and the end members being connected by a universal joint to said central member through said passages.

20. A truck member comprising pedestals, a frame comprising passages joining said pedestals together and means on said frame adapted for connection to other members through each of said passages.

21. A truck member comprising pedestals, a frame comprising passages joining said pedestals together and a truss spanning said frame and adapted for connection to other members through each of said passages.

In testimony whereof, I affix my signature.

CARL L. CHARLES.